United States Patent [19]
Azevedo et al.

[11] Patent Number: 5,475,726
[45] Date of Patent: Dec. 12, 1995

[54] PROCESS FOR THE RECONSTRUCTION OF THREE-DIMENSIONAL IMAGES OF AN AREA OF INTEREST OF AN OBJECT COMPRISING THE COMBINATION OF MEASUREMENTS OVER THE ENTIRE OBJECT WITH MEASUREMENTS OF AN AREA OF INTEREST OF SAID OBJECT, AND APPROPRIATE INSTALLATION

[75] Inventors: Stephen Azevedo, Livermore, Calif.; Pierre Grangeat, Saint Ismier; Philippe Rizo, La Tronche, both of France

[73] Assignee: Commissariat a l'Energie Atomique, Paris, France

[21] Appl. No.: 119,950

[22] Filed: Sep. 10, 1993

[30] Foreign Application Priority Data

Sep. 18, 1992 [FR] France ................... 92 11148

[51] Int. Cl.⁶ ................ A61B 6/03; G01N 23/08
[52] U.S. Cl. ................ 378/4; 378/8; 378/11; 378/901; 364/413.15
[58] Field of Search ............. 364/413.13, 413.14, 364/413.15, 413.16, 413.17, 413.18, 413.24; 378/9, 10, 11, 13, 14, 15, 19, 20, 901, 17

[56] References Cited

U.S. PATENT DOCUMENTS

| | | | |
|---|---|---|---|
| 3,973,128 | 8/1976 | LeMay | 378/19 |
| 5,068,882 | 11/1991 | Eberhard | 378/4 |
| 5,319,693 | 6/1994 | Eberhard et al. | 378/19 |
| 5,355,309 | 11/1994 | Eberhard et al. | 364/413.15 |
| 5,376,795 | 12/1994 | Hasegawa et al. | 250/363.04 |

OTHER PUBLICATIONS

Applied Optics (vol. 23—No. 22, Nov. 1984), Ohyama et al., New York, "Analysis and Improvement in Region–of–Interest Tomography" pp. 4105–4110.
Physics in Medicine and Biology (vol. 37—No. 3, Mar. 1992), Manglos, "Truncation Artifact Suppression in cone–beam radionuclide Transmission CT using maximum likelihood techniques: evaluation with human subjects" pp. 549–562.
Numerische Mathematik (vol. 56—No. 4, 1989), R. S. Varga, editor, "Incomplete Data Problems in X–Ray Computerized Tomography", Louis et al. pp. 371–383.
IEEE Transactions on Medical Imaging (vol. MI–3—No. 1, Mar. 1984, USA) "A Reconstruction Algorithm from Truncated Projections", Ogawa et al. p. 34–40.

*Primary Examiner*—David P. Porta
*Assistant Examiner*—David Vernon Bruce
*Attorney, Agent, or Firm*—Pearne, Gordon, McCoy & Granger

[57] ABSTRACT

Process and installation making it possible to reconstitute precise images of an area of interest (2) of an object (1) by reducing the errors produced by the contribution of the compliment of the object. A first series of measurements is carried out, where a conical beam (10) only takes in the area of interest of the object (2) and this is followed by a second series of measurements in which the beam takes in the entire object. A combination of the measurements of the two series is carried out in order to make them compatible and obtain a more accurate image of the area of interest (2).

10 Claims, 8 Drawing Sheets

PROCESS FOR THE RECONSTRUCTION OF THREE-DIMENSIONAL IMAGES OF AN AREA OF INTEREST OF AN OBJECT COMPRISING THE COMBINATION OF MEASUREMENTS OVER THE ENTIRE OBJECT WITH MEASUREMENTS OF AN AREA OF INTEREST OF SAID OBJECT, AND APPROPRIATE INSTALLATION

BACKGROUND OF THE INVENTION

The invention relates to a process for the reconstruction of three-dimensional images of an area of interest of an object and involves a combination of measurements performed on the complete object with measurements performed on an area of interest of the object, as well as to an appropriate installation.

Processes are already known in which there is only an interest in the reconstruction of bidimensional images on an area of interest of a more voluminous object, such as an organ in a human body. In the simplest procedure a series of unidimensional measurements are carried out on sections at different orientations around the object and then the results of the measurements are combined in an appropriate manner, as if it were necessary to reconstruct the image of the entire object. However, the unidimensional (linear) array of detectors responsible for carrying out the measurements is then disposed so as to substantially only receive radiation emitted by a source, which has traversed the area of interest of the object in accordance with the considered section (or in an equivalent manner radiation emitted by said area of interest). The reconstruction of bidimensional images is possible when a sufficient number of views have been taken by rotating the array of detectors around the object and then the three-dimensional images are obtained by superimposing bidimensional images taken on adjacent sections. However, for each measurement, there is a contribution of portions of the object located outside the area of interest, either in front of or behind the object in the field of vision of the detectors, and these portions are different for each orientation of the detectors, because there are no measurements on those portions of the object located on either side of the area of interest. Such measurements are called truncated measurements of the object and are due to inevitable reconstruction errors, unlike in the case of processes where the viewing field of the detectors takes in the entire object. However, taking in the entire object this would increase the complexity of the detector, its overall dimensions and its cost, or would lead to a less good resolution of the image of the area of interest if the same detector was retained.

Various methods have already been proposed in the case of a planar, fan-shaped radiation and a reconstitution of the object by superimposed parts in order to correct at least partly the truncation errors. In one of these methods, described in British patent 2 088 670, two series of measurements are performed: measurements across the area of interest of the object and measurements performed through the entire object, at a much lower radiation intensity so as to not cause excessive irradiation. The second series of measurements supplies informations at low frequencies or low resolution on the object, which make it possible to complete the images of the area of interest obtained as a result of the first series of truncated measurements. Other processes consist of introducing into the measurement combination calculations or estimates of results for portions of the object excluded from the area of interest, or simply the position of the external contour of the object, followed by the "extrapolation" of the radiation emission or attenuation sums collected during the measurements over the entire surface enclosed by the contour (article by Ogawa, Nakajima and Yuta entitled "A reconstruction algorithm from truncated projections", published in IEEE Transactions on Medical Imaging, vol. MI-3, No. 1, March 1984, pp 34 to 40).

SUMMARY OF THE INVENTION

The present invention applies to measurements performed with a conical radiation and having a focal point, point radiation source or convergence point of the collimators associated with the detectors, and the preceding methods become impossible as a result of the fact that between the two series of measurements, when the trajectory of the focal point changes, the acquisition lines cannot be made to correspond and it would be necessary to reconstruct the complete measurements and reproject them in the geometry of truncated measurements, which involves a very long calculating time.

The original process offered here makes it possible to carry out two series of measurements for a comparable objective to that of the preceding methods, but using a conical radiation, while the invention also relates to an installation making it possible to easily perform this process.

The process according to the invention can be looked upon as an improvement to the earlier-dated patent EP-A-292 402 and can be used in situations described in the prior art improvements according to EP-A-488 888 and 488 889. It is also possible to envisage the use of the invention for slightly different processes, such as those involving the calculation of the Radon transform (or the Hilbert transform of the first derivative of the Radon transform), rather than its first derivative, which forms the object of the first patent referred to hereinbefore.

The invention therefore relates to a process for the reconstruction of three-dimensional images of an object defined by values assumed by a function on points of the object, the function being a property of a conical radiation having a focal point and passing through the object, in which two series of measurements are performed, each of the series of measurements being performed with a bidimensional array of radiation detectors oriented towards the focal point, the measurements consisting of sums assumed by the function on rays between the focal point and the detectors and the process incorporating an inversion algorithm calculating summations of the function on planes passing through the object, wherein a first of the series of measurements is performed in such a way that the radiation received by the detectors passes through an area of interest of the object, the reconstructed image relating to the area of interest of the object, the second of the series of measurements being performed in such a way that the radiation received by the detectors passes through the entire object, the measurements of the second series completing the measurements of the first series before using the inversion algorithm.

In an advantageous form, the focal point passes through an identical trajectory during the two series of measurements.

According to another embodiment of the invention, the trajectories of the focal point are different, the focal point performs a first trajectory close to the object during the first series and a second trajectory remote from the object during the second series, and the measurements of the second series are rearranged by calculations so as to obtain sums of the function calculated in accordance with the points of the object on the lines joining the first trajectory and passing through the complete object, the measurements of the function rearranged by calculation being used for completing the measurements of the first series.

It is then advantageous for the rearrangement calculations of the measurements of the second series to incorporate a weighting of the measurements (weighted measurements), a derivation of the sun, nations in accordance with the rows and columns of the detector array, a summation of the derivatives of the weighted projections along planes and a linear combination of the results obtained respectively for the derivatives along the rows and along the columns of the detector array, a rearrangement to bring about parametrization in spherical coordinates of the planes of the Radon domain, as described in EP-A-292 402, a Hilbert transform of the derived, rearranged summations and sums of the Hilbert transforms of rearranged derived summations on circles perpendicular to the rows on which the sums of the function are reconstituted the circles passing through the origin and through said rows at two diametrically opposite points.

The installation designed for applying such processes has means for performing two rotations of the acquisition system, defined by the focal point and the detector array, around the object, so as to describe two acquisition series with different conical geometries. In an equivalent manner, consideration could be given to an acquisition system having a focal point and fixed detector and an object rotating in the acquisition system.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
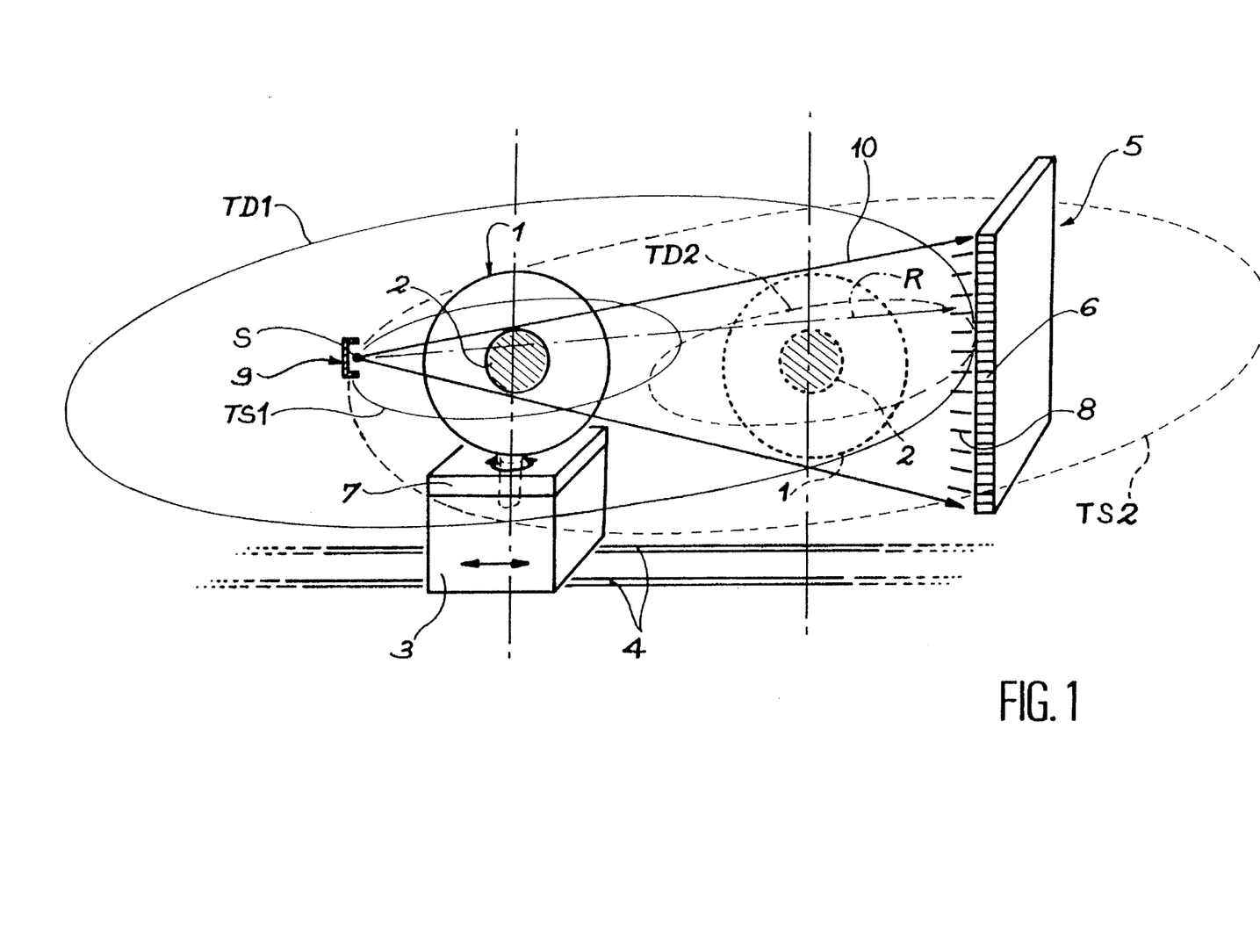
FIG. 1 An apparatus according to the invention with two separate trajectories of the focal point with respect to the object, the acquisition system being fixed and the object rotating in the acquisition system.

Reference is firstly made to FIG. 1. The object 1 is in the form of a ball and the area of interest 2 is in the form of a spherical core directed towards the center of the object 1. The area of interest 2 can have other shape, particularly cylindrical, as can the object 1, but this changes nothing with respect to the method, because it is merely necessary to consider the sphere including the object as object 1 and a sphere included by the measurements as the interest area 2.

It is completely normal to represent the images of the area of interest 2 on the basis of a simple volume of measurements, modelled by points defined by regular spherical or cartesian coordinates.

The object 1 is mounted on a frame 3, which can slide on rails 4 and which can be stopped at a random location thereon. A planar array 5 of detectors 6 is oriented or directed towards the object 1. The measurement system is designed in such a way that with each image point of the detector 6 is associated with a measuring line from the point radiation source 9 located beyond the object 1. The measurements consist of rotating a plate 7 of the frame 3 on which the object 1 is placed around a vertical axis, so that the object 1 presents all its faces to the detector array 5. Everything happens as if the focal point S and the detector array 5 were performing circular trajectories TS1 and TD1 with respect to the object 1, which is then assumed to be stationary, and centered on the rotation axis. In the position shown, the object 1 is much closer to the source 9, so that the useful beam 10 which it produces, i.e. that part of the beam which affects the detectors 6, only takes in the area of interest 2 of the object 1 in the different measurements of the first series.

In a second series of measurements, the frame 3 is displaced so that the object 1 is in a position represented in dotted line form and remote from the source 9, where the useful beam 10 takes in all the object 1. The new equivalent trajectories of the focal point S and the detector array 5 around a stationary object are designated TS2 and TD2. This series of measurements which represents a: small angular aperture and supplies complete data takes account of the contribution of each of the points of the object to the attenuation of the radiation and consequently supplies less image reconstruction errors than the first series, but a less satisfactory resolution for the interest area 2, as a result of the lower magnification factor. This is why it is appropriate to combine these two series of measurements in accordance with what is described hereinafter. It is pointed out that other installations are compatible with the process. In particular, it is possible for the useful beam 10 not to be produced by a source 9, but instead by the object 1, which occurs if the object 1 is a living organism and which for this purpose has ingested a radioactive labelling product. It is merely necessary for the detectors 6 to be provided with a collimator, whose holes are focused towards the focal point S so that the use conditions of the invention are retained. It can then be advantageous not to provide means such as the rails 4 for moving in or away the object 1 with respect to the detector array 5 and to replace, prior to the second series of measurements, the collimation system 8 by another system which displaces the focal point S on moving it away from the object 1. It is then possible to place the point S at infinity and use parallel rays. The cone of the beam can then be chosen with a smaller aperture, which can significantly improve the reconstruction of the image by reducing or eliminating a shadow area of the results, as will be explained hereinafter.

It is also possible for the object 1 to be fixed, which is in particular advantageous when it emits the radiation, while the detector array 5 is attached to a circular rail surrounding the object 1. It is possible to have two concentric circular rails and two different diameters, as well as two detector arrays, each attached to one of the rails which successively or simultaneously perform the measurements. It is also possible to have a system where the detector array is supported by an arm provided either with a rail making it possible to adjust the distance between the detector array and the rotation axis, or two rails if the apparatus has two arrays.

Figure 2:
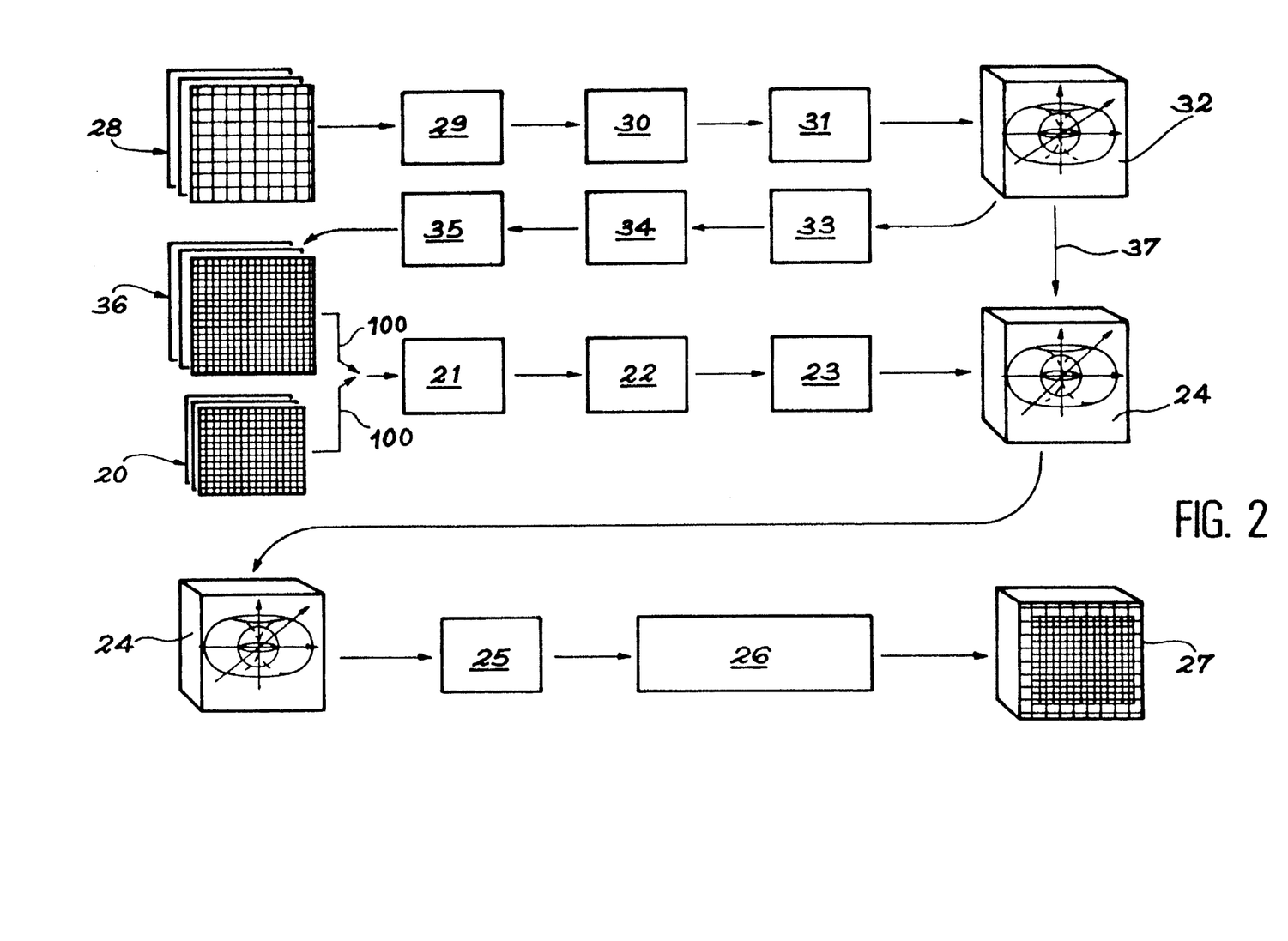
FIG. 2 The general flow chart of the process.

Reference will now be made to FIG. 2. The measurements consist of evaluating the sum of the attenuation of the radiation on the rays R of the useful beam 10, which are projected from the focal point S onto the image points of the detector array 5, i.e. the total attenuation of the radiation on all the points of the object 1 through which each ray R passes, or the total radiation produced by said same points. When measurements of high resolution projections 20 (of the first series of measurements, where the object 1 is represented in continuous line) have been performed on an adequate number of said projections traversing the area of interest 2 of the object 1, a set of truncated projections has been obtained on the object, which is only complete with respect to the area of interest. The set of projections cannot be directly reconstructed using the teaching of the prior art patent. It is firstly necessary to complete these projections on the basis of complete measurements of the object (measurements of the second series, where the object is represented in dotted line form). The first derivative of the Radon transform of the first series of measurements is calculated by successively performing a weighting 21, a differentiation 22, a summation and a rearrangement 23 in order to obtain a high resolution description 24 of the first derivative of the Radon transform of the area of interest of the object 2. At this level, calculation takes place as explained hereinafter of the projections missing in the first acquisition series, which is completed and reconstructed in accordance with the prior art patent in order to represent the area of interest 2 and as a function of the different incidences of the focal point S in order to arrive at the image 27 of the area of interest 2.

All these stages except the calculation of the missing projections from the first derivative of the Radon transform of the object are performed in accordance with the first mentioned patent resulting from the same team of inventors and which described how images could be reconstructed by the truncations of the first derivative of the Radon transform of the function representing the image, i.e. the attenuation or emission of the radiation. The Radon transform of the function is defined as all the sums of local values of the function on points of each plane passing through at least one point of the domain on which the function is defined. It is therefore necessary to calculate sums of the function on planes, which is not difficult, provided that there is a definition of the rows of summations as intersection lines of planes with the detector array. Consideration is then given to the sum of the measurements of the detectors through which passes the summation line, of the considered plane.

However, it is necessary to weight the measurements of the sums on the rays R in order to compensate the distortions produced by the different distances of the detectors 6 from the focal point S, which explains stage 21 and the rearrangements associated with the sums of stage 23 consist of passing from the system of coordinates linked with the source positions to the system of spherical coordinates of the Radon domain, which imposes interpolations. The influences of the detectors 6 consequently vary. Finally, the differentiation 22 represents the realization of formulas (4) and (5) of the prior art patent, which express derivations of the sums of the function and projection lines on the detector array 5, i.e. calculations of sums of variation levels along detector rows and columns, followed by a linear combination of the results so that the content of the high resolution description 24 relates to the first derivative of the Radon transform rather than to the actual transform, so as to obtain a better precision. However, this differentiation stage 22 is optional.

The high resolution description 24 is performed in what is called the Radon domain or volume, which comprises the projection points of a single origin on all the planes on which the sum of the function has been calculated. These origin projection points are called characteristic points of the planes and the origin is chosen as the origin of the definition mark of the reconstruction images. It is demonstrated in the earlier-dated patent that the Radon volume is a torus centred on the origin and formed by the revolution of a circle, whereof a diameter passes through the origin and through the; focal point S when the latter follows a circular trajectory centred on the origin.

Therefore the sum of the function on a plane, or the derivative of said sum calculated according to the prior art patent, is associated with the characteristic point of the plane. The differentiation 25 corresponds to that of formula (8) of the prior art patent along the way connecting the origin to the considered point and the retroprojections 26 consist of forming sums of differentiated quantities according to formulas (8) and (9) to obtain the distribution of the function. However, as stated, the influence of the missing measurements linked with the portions of the object 1 outside the interest area 2 falsifies the results and prejudices the quality of the image.

This is why use is made of other projections obtained through the entire object 1 during the low resolution projection measurements 28 of the second series of measurements. Stages 29, 30 and 31 are performed, which are similar to stages 21, 22 and 23, in order to obtain a low resolution description 32 of the first derivative of the Radon transform of the entire object 1. The operations which are more specifically characteristic of the invention are then weighting operations 33, Hilbert transforms 34 and retroprojections 35 in order to transform the first derivative of the Radon transform of the low resolution object 32 into high resolution projection calculations 36. These projections are similar to the high resolution projection measurements 20, because they express sums of the function on rays which pass through the trajectory TS1 of the focal point S during the first series of measurements. Use is made of the mixture of the measured and calculated projections 20, 36 in order to perform the stages 21 to 26 and thus obtain a more accurate image 27. This mixture is symbolized by the arrows 100 in FIG. 2.

Figure 3:
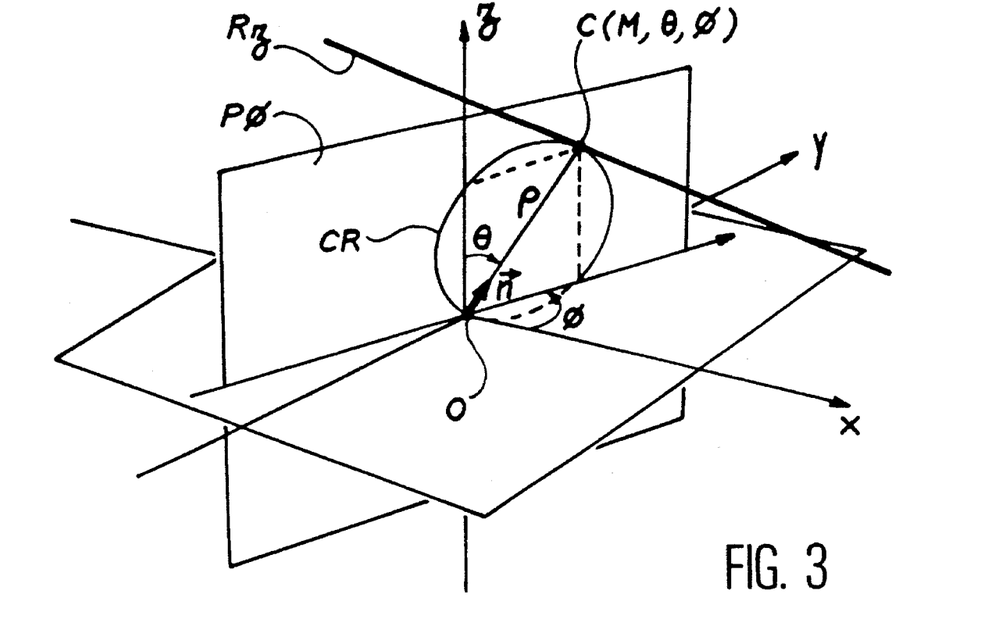
FIG. 3 A graphical representation of the summation circles according to which the function sums are reconstituted, in the particular case of lines perpendicular to the rotation axis.

Stages 33 to 35 will be explained in greater detail relative to FIG. 3.

If z is the rotation axis of the object 1 or the focal point S and x and y are two fixed axes perpendicular to the other axis and to one another, consideration will be given to a ray Rz parallel to the plane Oxy, i.e. whereof all points are at the seine ordinate z. Rz is perpendicular to a plane to which belongs the axis z and which is located at the longitude $\phi$ relative to the axis x. This projection plane P$\phi$ carries the point C (M, $\theta$, $\phi$) of projection or intersection of the ray Rz, which can be defined relative to the origin 0 and the axis z by the colatitude $\theta$ and the ray $\rho$, i.e. $\overrightarrow{OC}=/\overrightarrow{\rho n}$.

If f is the radiation attenuation or emission function, the sum $\overline{X}_z$ of said function on the ray Rz can be expressed by the formula $$X = f(r, \phi) = \int_{-\infty}^{\infty} \int f(x, y, z)\delta(x\cos\phi + y\sin\phi - r)dxdy.$$

in which $\delta$ designates the Dirac function.

In an as yet unpublished document, the inventors demonstrate that this sum could be expressed by the formula $$X = f(r, \phi) = \frac{1}{2\pi} \int_o^\pi HDRf(z\cos\theta + \sin\theta, \theta, \phi) \, d\theta$$

in which R designates the Radon transform of the function f, D its first derivative and H the Hilbert transform, whose expression is given by the formula $$Hg(p) = \frac{1}{\pi} \int_\infty^{-\infty} \frac{g(p')}{p - p'} \, dp'.$$

The characteristics points of the Radon domain on which the quantity located in the integral defining $\overline{X}_z f(r, \phi)$ must be calculated and added are located on a retroprojection circle CR located in the meridian plane P$\phi$ and of diameter 0C. Thus, it is possible to calculate the sum of the attenuation on the ray Rz even if this could not be measured, said ray passing aside from all the positions which the focal point S has occupied. Moreover, the application of the formula imposes calculations identical to those of the reconstruction of the image, which is very practical.

Figure 4:
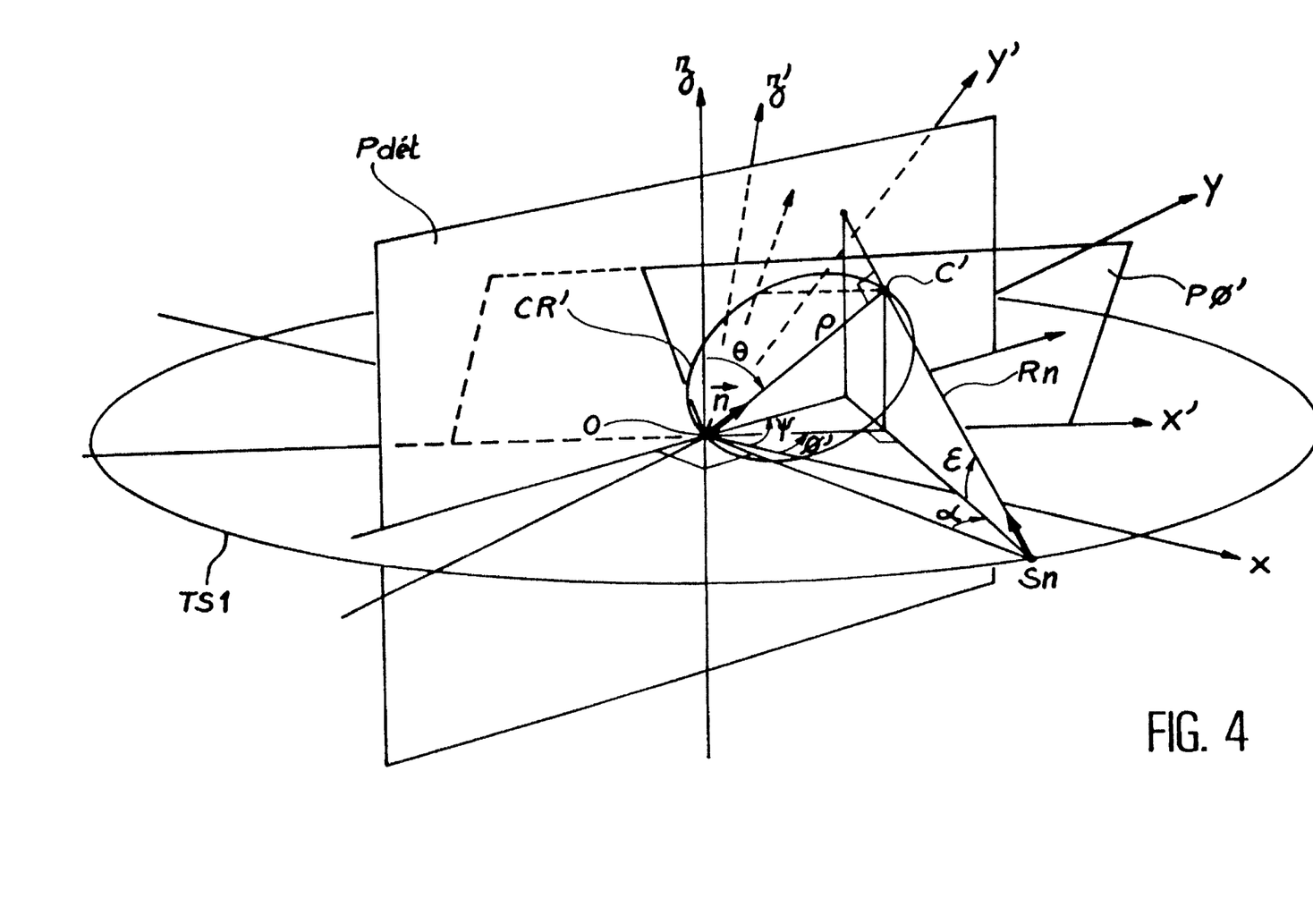
FIG. 4 A graphical representation of the summation circles along which the sums of the function are reconstituted in the general case.

The considered ray Rz was parallel to the plane Oxy. Generalization can be made to a ray Rn of random orientation as shown in FIG. 4. Although the rays Rn can be freely chosen, in reality the formula is only applied to rays passing through the trajectory TS1 of the focal point S traversed during the first series of measurements (which they intersect at respective points Sn), so that the calculated projections 36 can be immediately combined with the measured high resolution projections 20. One way of carrying out this combination is to define on the basis of the volume 32 of the first derivative of the low resolution Radon transform of the object, the projection points missing in the acquisitions 20 of the first series of measurements and determine the projections as a consequence thereof. The detector array 5 would be located parallel to a detection plane Pdet passing through the origin 0 for said position Sn of the focal point, where the projection of the detection plane Pdet on the plane Oxy parallel to the axis z is spaced from the fixed axis x by a precession angle $\psi$ with respect to the axis X. The projection of the ray Rn onto the plane Oxy parallel to the axis z forms with the segment 0Sn an angle $\alpha$, the ray Rn with said projection forms an angle $\epsilon$ and $\phi'$ designates the angle between the perpendiculars to said projection and the axis x.

A rotation of angle $\phi'$ about the axis z followed by a rotation of angle $\epsilon$ about the transformed axis x' of the axis 0x following the preceding rotation makes it possible to obtain a new reference mark 0x'y'z' in accordance with the tranformation summarized in the formula $$\begin{bmatrix} x' \\ y' \\ z' \end{bmatrix} = \begin{bmatrix} \cos\phi' & \sin\phi' & 0 \\ -\sin\phi'\cos\epsilon & \cos\phi'\cos\epsilon & \sin\epsilon \\ \sin\phi'\sin\epsilon & -\cos\phi'\sin\epsilon & \cos\epsilon \end{bmatrix} \begin{bmatrix} x \\ y \\ z \end{bmatrix}$$

The situation is then the seine as in the preceding case except that the plane P$\phi'$ orthogonal to the ray Rn and which passes through the origin 0 contains the axes x' and z' and is therefore inclined, because the points on which it is necessary to apply the formula belong to the circle CR' of diameter 0C', in which C' is the intersection and the projection of the ray Rn on the plane P$\phi'$ and the circle CR' belongs to the plane P$\phi'$. The formula applied is then:

$$Xf(S,A) = \frac{1}{2\pi} \int_o^\pi HDRf(z'\cos\theta' + X'\sin\theta', \theta', \phi')d\theta.$$

This is why it is necessary to firstly obtain the low resolution description 32 of the first derivative of the Radon transform of the complete object 1 in the Radon domain associated with the second series of measurements. The inversion formulas of the first derivative of the Radon transform (formula (6) of the prior art patent) reveal a weighting by a factor $\sin\theta$ of the calculated values of the first derivative of the Radon transform. To reduce the number of multiplications to be carried out in the processing chain of the first acquisition series (stages 21 to 26), the factor sing can be introduced into normalization factors used in the sun, nation-rearrangement stages 31 and 23. In this case, it is necessary to use a weighting stage 33 to divide the weighted calculated values of the first derivative of the Radon transform by the factor $\sin\theta$. Moreover, if necessary, stage 33 can also be used for introducing a normalization factor, like the factor $\frac{1}{2\pi}$ of the above formula. However, it is of interest to integrate this overall factor into the Hilbert transform filter used in stage 34, in order to eliminate stage 33 and therefore speed up the calculations.

The following calculations are normally performed on calculation points located on retroprojection circles CR' with distributions in colatitudes $\theta'$, which are identical to the distributions of the characteristic points of the low resolution description 24 in the colatitude $\theta$. According to the aforementioned formula expressing $\widetilde{x_f}(S,A)$ they comprise Hilbert transform calculations of the points in stage 34 and sums along circles CR' in stage 35.

The combined use of measured and calculated high resolution projections improves the quality of the images of the interest area 2, but it is necessary to add that the low resolution description of the Radon transform derivative 32 can be useful for other purposes, because its content can be directly incorporated into the high resolution description 24 of the Radon transform derivative of the object 1. This will become clear with the aid of FIG. 5.

Figure 5:
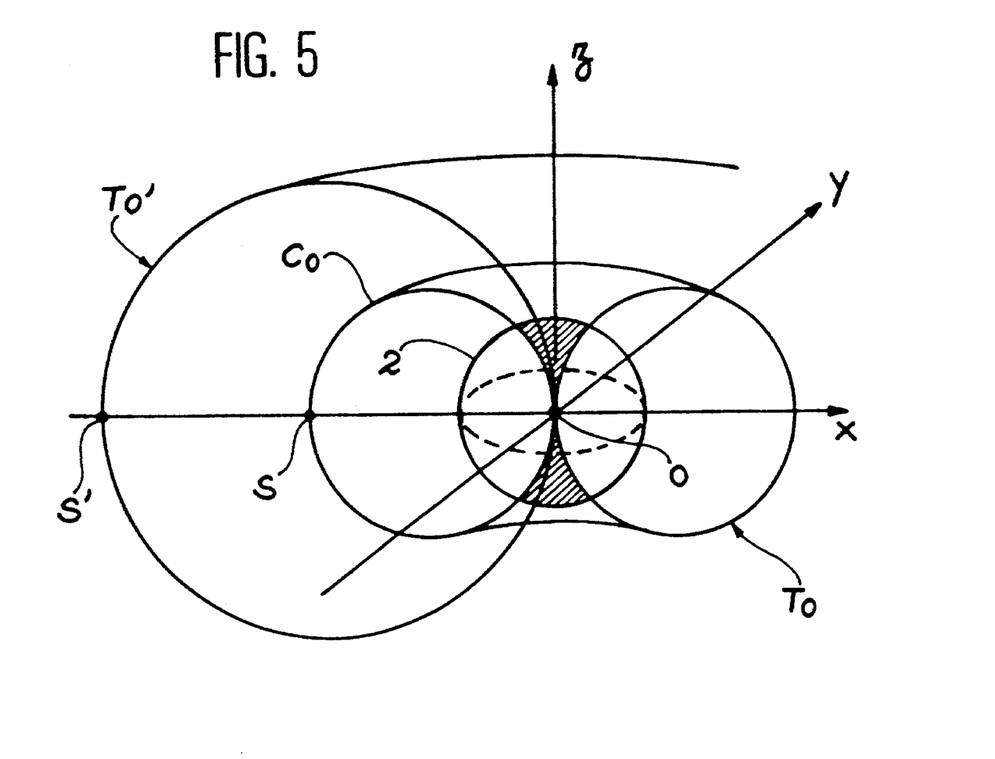
FIG. 5 The notion of shadow areas.

The characteristic points of the planes in which it is possible to calculate the sum of the function are, for a single position of the focal point S, a sphere whose diameter passes through said position and through the origin 0 and whereof a section through a plane traversing the axis and the focal point is the circle Co shown in FIG. 5, as stated. For several measurements performed along a circular trajectory of the focal point S, it is possible to demonstrate that the volume of these characteristic points is a torus To obtained by the revolution of said sphere around the rotation axis, here z. If the interest area 2 is itself centered on the origin 0, it can be seen that the parts close to the axis z do not belong to the torus To and are therefore in what is called a shadow area, whereof the contribution of the points to the image reconstruction calculations cannot be accurately evaluated. By convention, it is possible to allocate to the shadow area points the value of the sum of the function associated with the closest characteristic points belonging to the torus To, which the inventors call an order zero interpolation. More complicated interpolations are possible, but the invention offers the interest of obtaining precise estimates on a part of the shadow area. Thus, the measurements of the second series are performed with positions of the focal point S' further away from the origin 0. The torus To' produced in the same way is larger and closer to the axis z. The shadow area which it leaves is therefore smaller and tends to become zero when the point S is displaced with respect to infinity, which is the case if a substantially parallel collimation is used for the second series of measurements. Thus, the results obtained during the second series of measurements are sampled for incorporation into the shadow area of the first series, without transforming them.

The arrow 37 symbolizes this direct enrichment of the high resolution description 24 by the low resolution description 32.

Figure 6:
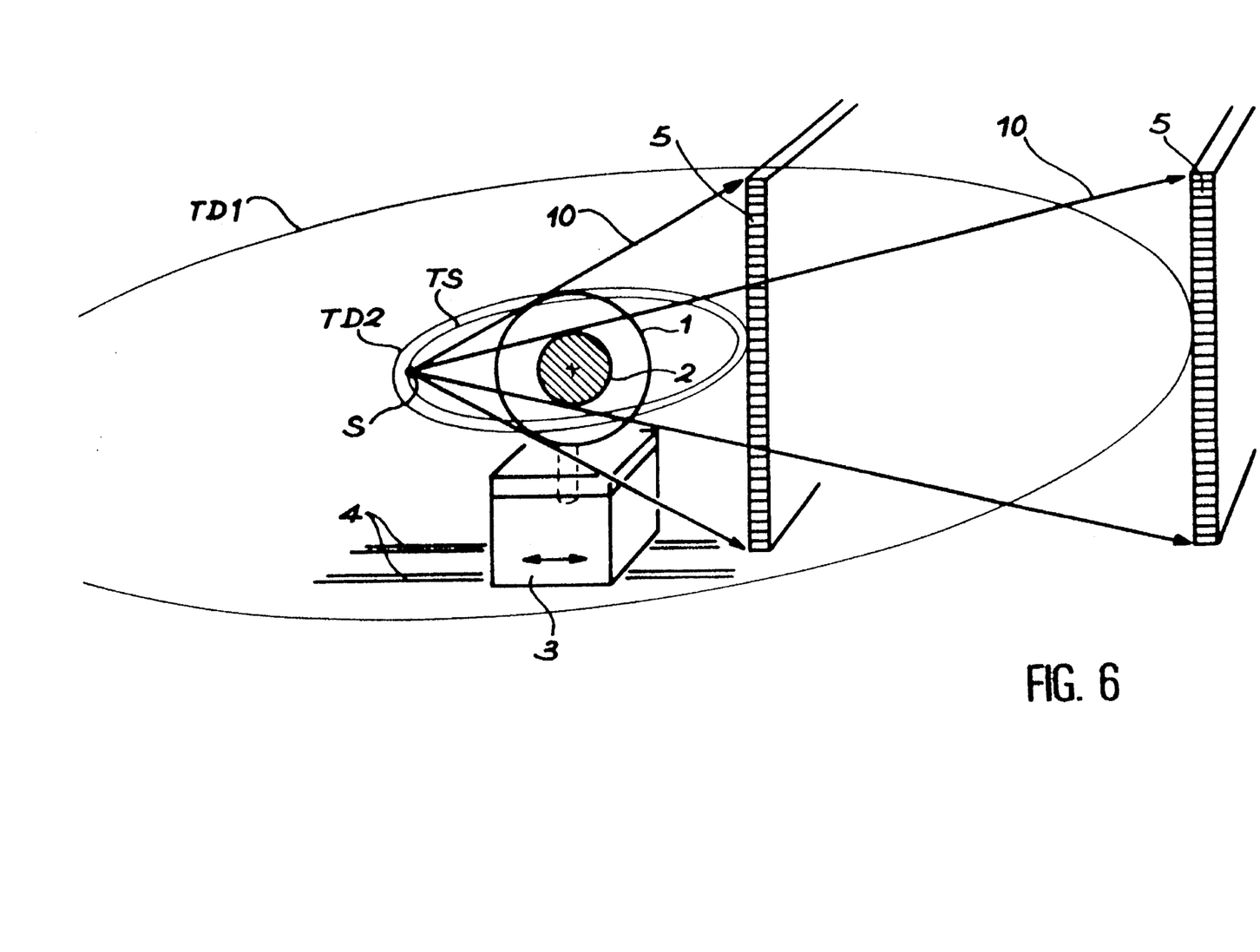
FIG. 6 A second embodiment of the apparatus according to the invention.

Another embodiment of the invention illustrated in FIG. 6 is associated with a highly simplified process of the reconstruction of the image of interest area 2, however, it cannot always be conveniently used and use is then made of the processes of the preceding drawings.

The originality of the latest embodiment is that the focal point S traverses the same trajectory during two series of measurements. This is possible e.g. if the apparatus emitting it is linked with the frame 3 in the embodiment of FIG. 1, or when using two appropriate collimators for the detector array 5 when the radiation is emitted by the object 1.

The detector array 5 traverses the same trajectories TD1 and TD2 as in the embodiment of FIG. 1. The combination of the two series of measurements is highly simplified, because the rays of identical position traverse the same points of the object 1 during the two series of measurements. There is no longer any need to reconstitute fictional rays of the first series of measurements by stages 29 to 35 and in particular by the Radon and Hilbert transforms.

The passage from the volume 28 to the volume 36, for each measuring angle, then amounts to a sampling gird change, the sampling grid of volume 36 frequently having smaller sampling spacings than the sampling grid of the volume 28, which can be carried cut by conventional interpolation procedures.

Thus, apart from the high resolution projections 20 on the interest area of the object, there are also low frequency projections, identical to 28, on the entire object, but it is possible to immediately combine them with the high resolution projections 20 in order to apply the measurement inversion algorithm.

Figure 7:
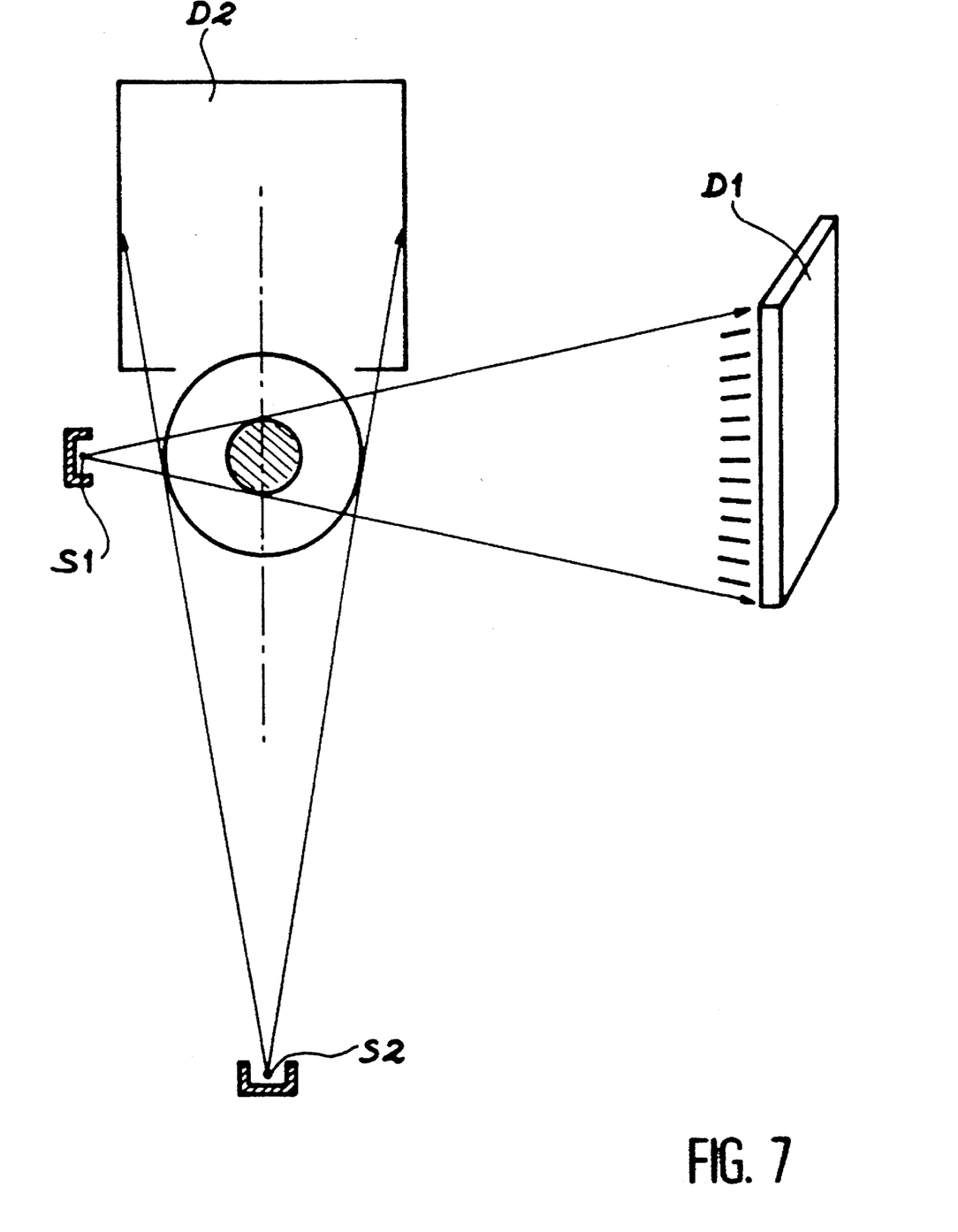
FIG. 7 A third embodiment of the apparatus according to the present invention.

FIG. 7 shows another embodiment where two sources S1, S2 are simultaneously active for carrying out the measurements, in combination with two detector arrays D1, D2 respectively associated therewith. One is responsible for the low frequency measurements and the other for the high frequency measurements. Preferably, it is the object 1 which rotates in such a construction. The two series of measurements are combined without any change.

Figure 8A:
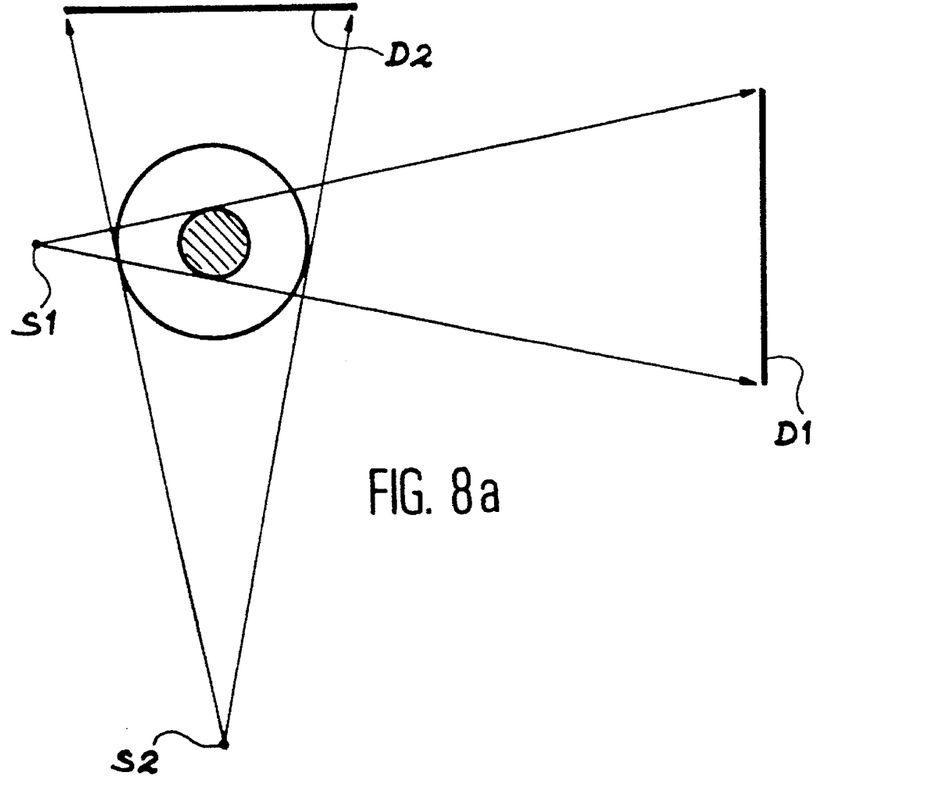
FIGS. 8a, 8b & 8c Three different ways of performing the invention.
Figure 8B:
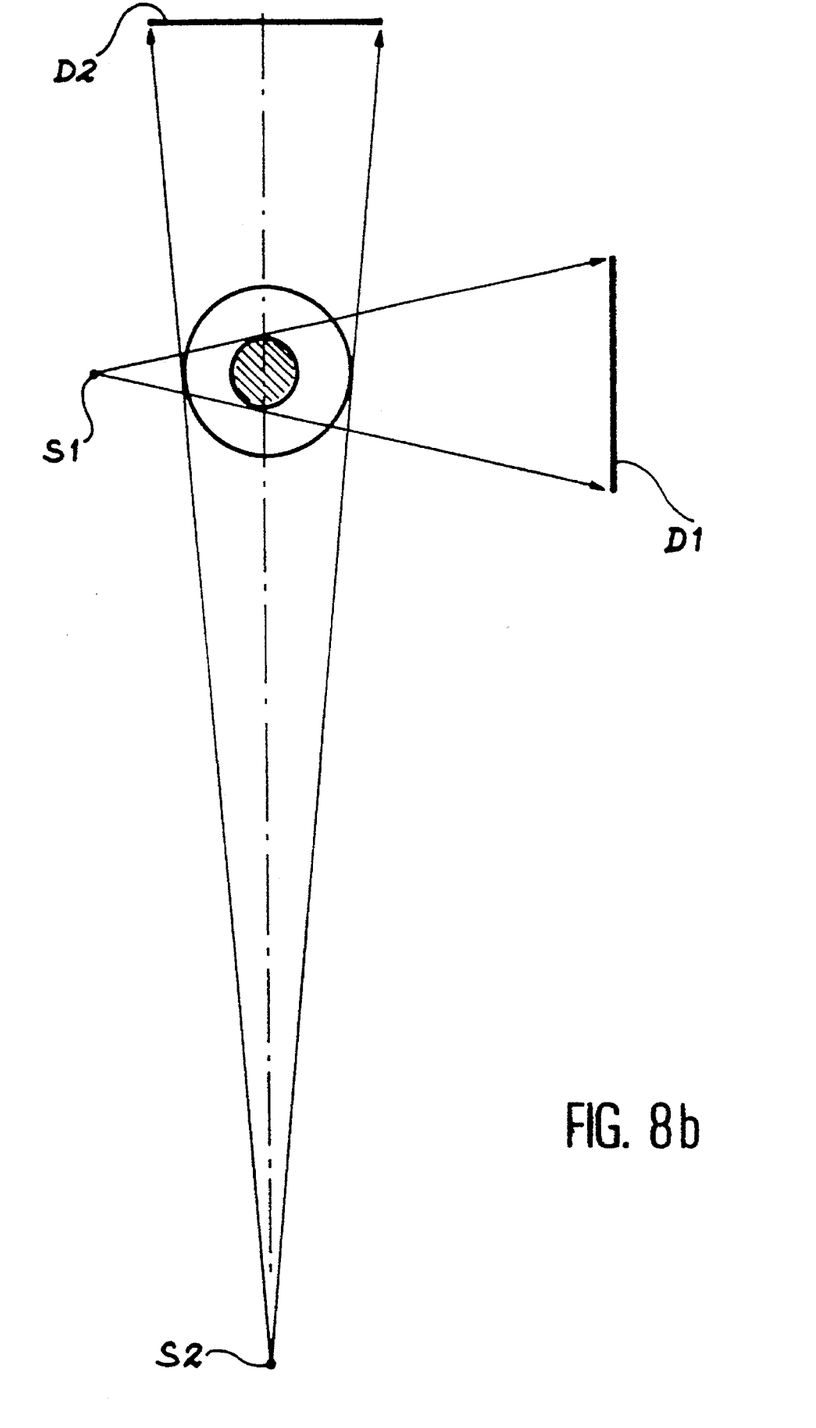
Figure 8C:
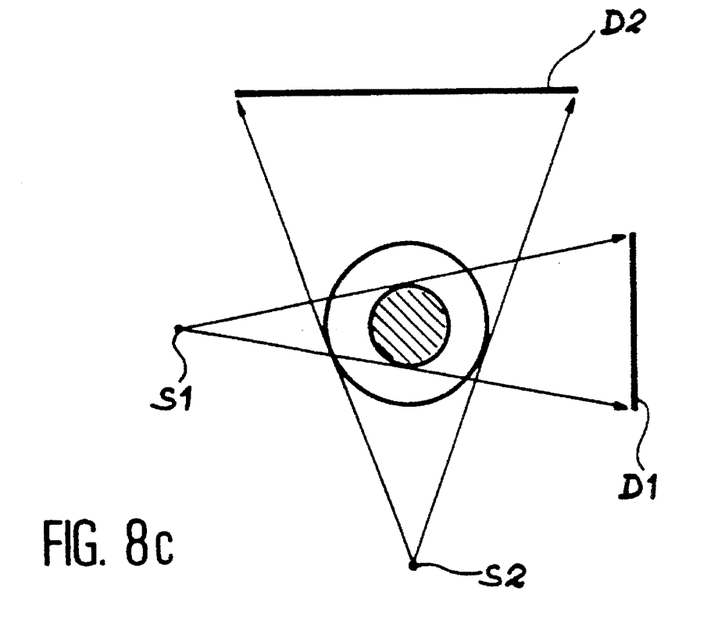

It is pointed cut that the acquisitions are made by an acquisition system e.g. constituted by a source X and a detector X for the measurements in transmission, or a gamma camera and a collimator for the measurements in emission. To accelerate the acquisitions, it is preferable to use two acquisition systems for simultaneously acquiring the two low and high resolution acquisition series, as described in FIG. 7. Several configurations can be envisaged and in particular that where the distances between the focal points and the detectors are constant (cf. FIG. 8*a*), that where the distances between the: rotation axis and the detector are constant (cf. FIG. 8*b*) and that where the distances between the source and rotation axis are constant, but with variable detector sizes (cf. FIG. 8*c*). In the third case, it is assumed that for technical reliability reasons, the large detector has an inferior spatial resolution to the small detector.

In general terms, this approach could be generalized to devices using two common axis, circular acquisition trajectories, as described in French patent 90 14957, or not, as described in French patent 90 14958, the difference in the present invention being that one of the acquisition series is limited to projections of the area of interest.

The present invention can be used in all fields where it is wished to reconstruct images of the interior of an object and in particular in medicine and non-destructive testing in industry.

We claim:

1. Process for the reconstruction of three-dimensional images of an object (1) defined by values assumed by a function (f) on points of the object, the function being a property of a conical radiation having a focal point (S) and passing through the object, in which two series of measurements are taken on said object, each of the series of measurements being taken with a bidimensional array (5) of radiation detectors (6) oriented toward the focal point, the measurements consisting of sums assumed by the function on rays between the focal point and the detectors and the process incorporating an inversion algorithm calculating summations of the function on planes passing through the object, comprising the steps of:

taking a first of said two series of measurements such that the radiation received by the detectors passes through an area of interest of the object, the reconstructed image relating to the area of interest of the object; and taking a second of said two series of measurements such that the radiation received by the detectors passes through the entire object, the measurements of the second series completing the measurements of the first series before using the inversion algorithm.

2. Process according to claim 1, wherein the focal point traverses a first trajectory close to the object during the first series of measurements and a second trajectory remote from the object during the second series of measurements, and the measurements of the second series are rearranged by calculations so as to obtain sums of the function calculated in accordance with the points of the object on the lines joining the first trajectory and passing through the complete object, the measurements of the function rearranged by calculation being used for completing the measurements of the first series of measurements.

3. Process according to claim 2, wherein the rearrangements comprise summations of the measurements on planes.

4. Process according to claim 3, wherein the rearrangements comprise the calculation of the first derivative of the Radon transform of the function.

5. Process according to claim 4, wherein the rearrangement calculations of the measurements of the second series of measurements comprise a weighting of the measurements, a derivation of the summations along the rows and columns of the detector array, a summation of the derivatives of the weighted projections along planes and a linear combination of the results obtained respectively for the derivatives along the rows and along the columns of the detector array, a rearrangement, a Hilbert transform of the rearranged derives summations and sums of the Hilbert transforms of the rearranged derived summations on circles perpendicular to the rows on which the sums of the function are reconstituted, the circles passing through an origin point and through these rows at two diametrically opposite points.

6. Process according to claim 5, further comprising an enrichment of the results of the calculation of the first derivative of the Radon transform obtained on the first series of measurements with the calculation results of the first derivative of the Radon transform obtained on the second series of measurements (stage 37).

7. Process according to claim 1, wherein the focal point (S) traverses the same trajectory during the two series of measurements.

8. Installation designed for reconstructing a three-dimensional image of an object defined by values assumed by a function (f) on points of the object, the function being a property of a conical radiation having a focal point (S) and passing through the object, said installation comprising a bidimensional array (5) of radiation detectors (6) oriented toward the focal point, and means (4, 7) for moving the detector array (5) along two trajectories around the object (1) at different distances from said object, wherein radiation received by the detectors passes through an area of interest of the object and, the reconstructed image relates to the area of interest of the object during a first of said two trajectories, and radiation received by the detectors passes through the entire object during a second of said two trajectories, the installation further comprising means for acquiring sums of the function on rays between the focal point and the detectors and performing an inversion algorithm calculating summations of the function on planes passing through the object.

9. Installation according to claim 8, further comprising two different collimation systems (8) for the detector array.

10. Installation according to claim 8, wherein two acquisition systems are used for simultaneously acquiring the two series of measurements.

* * * * *

UNITED STATES PATENT AND TRADEMARK OFFICE
CERTIFICATE OF CORRECTION

Page 1 of 2

PATENT NO. : 5,475,726
DATED : December 12, 1995
INVENTOR(S) : Azevedo et al.

It is certified that error appears in the above-indentified patent and that said Letters Patent is hereby corrected as shown below:

Column 3, line 8, delete "sun. nations" and insert --summations--;

line 19, after "reconstituted" insert --,-- (comma); and          line 63, delete "other" and insert --another--.

Column 4, line 30, delete "a:" and insert --a--.

Column 5, lines 34 and 35, delete "first mentioned" and insert --first-mentioned--; and          line 49, delete "," (comma).

Column 6, line 13, delete "the;focal" and insert --the focal--;

line 58, delete "seine" and insert --same--; and          line 64, after "=" delete "/".

Column 7, line 4, delete "X=" and insert --$\overline{X}$=--; and line 13, delete "X=" and insert --$\overline{X}$=--.

Column 8, line 8, delete "seine" and insert --same--;

line 31, delete "sing" and insert --sine--; and          lines 32 and 33, delete "sun. nation-rearrangement" and insert --summation-rearrangement--.

UNITED STATES PATENT AND TRADEMARK OFFICE
CERTIFICATE OF CORRECTION

PATENT NO. : 5,475,726
DATED : December 12, 1995
INVENTOR(S) : Azevedo et al.

It is certified that error appears in the above-indentified patent and that said Letters Patent is hereby corrected as shown below:

Column 9, line 49, delete "cut" and insert --out--; and
        line 65, delete "cut" and insert --out--.

Column 10, line 8, delete "the:" and insert --the--.

Column 12, line 8, (Claim 8, line 11) delete "and." and insert --and--.

Signed and Sealed this

Seventh Day of May, 1996

Attest:

BRUCE LEHMAN

*Attesting Officer*    *Commissioner of Patents and Trademarks*